(12) United States Patent
Okumura (10) Patent No.: US 10,635,362 B2
(45) Date of Patent: Apr. 28, 2020

(54) IMAGE FORMING APPARATUS, IMAGE FORMING SYSTEM TO DETERMINE IMAGE CATEGORY FOR USING FIRST SHEET AND SECOND SHEETS

(71) Applicant: KYOCERA Document Solutions Inc., Osaka (JP)

(72) Inventor: Ryuichi Okumura, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/983,870

(22) Filed: May 18, 2018

(65) Prior Publication Data

US 2018/0335984 A1 Nov. 22, 2018

(30) Foreign Application Priority Data

May 22, 2017 (JP) .................. 2017-100896

(51) Int. Cl.
*G06F 3/12* (2006.01)
*H04N 1/32* (2006.01)
(Continued)

(52) U.S. Cl.
CPC .......... *G06F 3/1219* (2013.01); *G06F 3/1229* (2013.01); *G06K 15/16* (2013.01); *G06K 15/4065* (2013.01); *H04N 1/3248* (2013.01); *G06F 3/1288* (2013.01); *G06K 9/00422* (2013.01); *H04N 1/00042* (2013.01); *H04N 1/4056* (2013.01); *H04N 1/4057* (2013.01)

(58) Field of Classification Search
None
See application file for complete search history.

(56) References Cited

U.S. PATENT DOCUMENTS

2009/0257087 A1* 10/2009 Honda .................. G06F 3/1204
358/1.15
2010/0165405 A1* 7/2010 Okumura ........... H04N 1/00572
358/1.16
(Continued)

FOREIGN PATENT DOCUMENTS

JP 2014-236272 A 12/2014

OTHER PUBLICATIONS

Machine Translation in English of JP Pub 2014-236272 to Kimura Shinichi.*

*Primary Examiner* — Benny Q Tieu
*Assistant Examiner* — Haris Sabah
(74) *Attorney, Agent, or Firm* — Studebaker & Brackett PC (57) ABSTRACT

An image forming apparatus includes an image forming section and a controller. The image forming section forms an image on a first sheet or a second sheet. The controller controls the image forming section. The first sheet is a blank sheet. The second sheet is a reused sheet. The controller refers to reference images each belonging to any of a plurality of categories to determine whether or not the image belongs to any of the categories. The controller directs the image forming section to form the image on the second sheet when determining that the image does not belong to any of the categories. The controller directs the image forming section to form the image on the first sheet and stores the image as a reference image when determining that the image belongs to any of the categories.

9 Claims, 4 Drawing Sheets

(51) Int. Cl.
    *G06K 15/00*     (2006.01)
    *G06K 15/16*     (2006.01)
    *H04N 1/00*     (2006.01)
    *H04N 1/405*     (2006.01)
    *G06K 9/00*     (2006.01)

(56) References Cited

U.S. PATENT DOCUMENTS

| | | | |
|---|---|---|---|
| 2011/0109940 A1* | 5/2011 | Silverbrook | G06K 19/06037 358/1.15 |
| 2013/0070305 A1* | 3/2013 | Tomizawa | H04N 1/00127 358/3.28 |
| 2016/0142582 A1* | 5/2016 | Kobayashi | H04N 1/393 358/1.2 |

* cited by examiner

IMAGE FORMING APPARATUS, IMAGE FORMING SYSTEM TO DETERMINE IMAGE CATEGORY FOR USING FIRST SHEET AND SECOND SHEETS

INCORPORATION BY REFERENCE

The present application claims priority under 35 U.S.C. § 119 to Japanese Patent Application No. 2017-100896, filed on May 22, 2017. The contents of this application are incorporated herein by reference in their entirety.

BACKGROUND

The present disclosure relates to an image forming apparatus and an image forming system.

An image forming apparatus includes a sheet feed section, a conveyance section, an image forming section, storage, and a controller. The sheet feed section includes a plurality of sheet feed cassettes. The sheet feed cassettes include a sheet feed cassette able to house a plurality of reused sheets and a sheet feed cassette able to house a plurality of blank sheets. One side of each reused sheet has been used. That is, an image has been formed on only one side of the reused sheet. The conveyance section conveys the reused sheets or the blank sheets from the sheet feed section toward the image forming section. The image forming section forms an image based on image data on a reused sheet or a blank sheet.

The storage stores specific information including a specific image and a specific character string. The controller determines whether or not an image includes the specific information based on the image data indicating the image and the specific information. The controller directs the sheet feed section, the conveyance section, and the image forming section to form the image on a reused sheet when the image does not include the specific information. By contrast, the controller directs the sheet feed section, the conveyance section, and the image forming section to form the image on a blank sheet when the image includes the specific information.

SUMMARY

An image forming apparatus according to the present disclosure includes an image forming section and a controller. The image forming section forms an image on a first sheet or a second sheet. The controller controls the image forming section. The first sheet is a blank sheet. The second sheet is a reused sheet of which one side has been used. The controller refers to reference images each belonging to any of a plurality of categories to determine whether or not the image belongs to any of the categories. The controller directs the image forming section to form the image on the second sheet when determining that the image does not belong to any of the categories. The controller directs the image forming section to form the image on the first sheet and stores the image as a reference image when determining that the image belongs to any of the categories.

An image forming system according to the present disclosure includes an image forming apparatus and a server. The image forming apparatus includes an image forming section that forms an image on a first sheet or a second sheet. The server exchanges data with the image forming apparatus through a network. The image forming apparatus further includes a first controller that controls the image forming section. The first sheet is a blank sheet. The second sheet is a reused sheet of which one side has been used. The server includes a second controller that refers to reference images each belonging to any of a plurality of categories to determine whether or not the image belongs to any of the categories. The first controller directs the image forming section to form the image on the second sheet when the second controller has determined that the image does not belong to any of the categories. The first controller directs the image forming section to form the image on the first sheet when the second controller has determined that the image belongs to any of the categories. The second controller stores the image as a reference image when determining that the image belongs to any of the categories.

DETAILED DESCRIPTION

An image forming apparatus 1 according to an embodiment of the present disclosure will be described as follows with reference to the drawings. It should be noted that elements in the drawings that are the same or equivalent are labelled using the same reference signs and description thereof is not repeated. The drawings are schematic illustrations that emphasize each element of configuration in order to facilitate understanding thereof.

Figure 1:
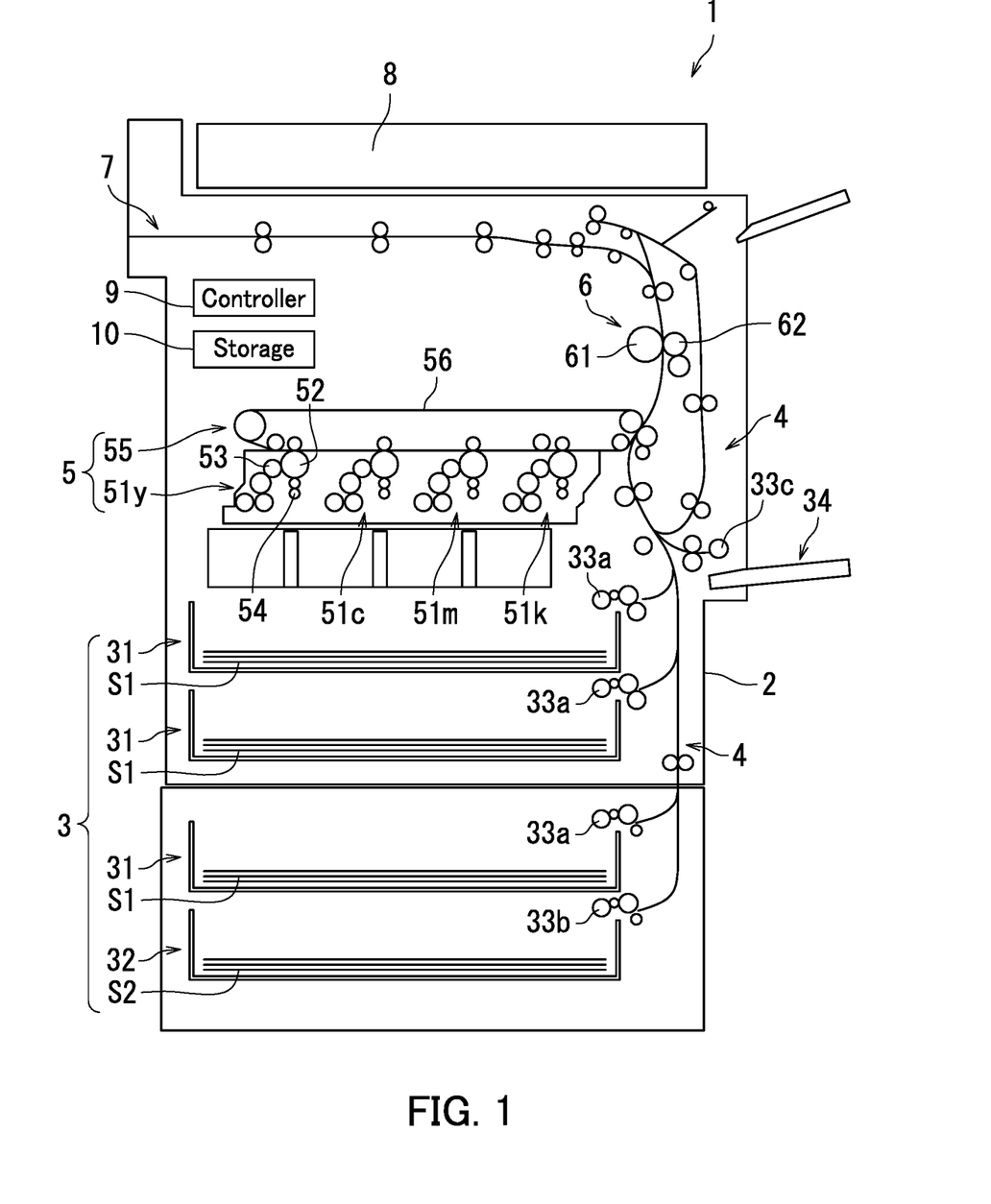
FIG. 1 is a diagram illustrating a configuration of an image forming apparatus according to an embodiment of the present disclosure.

The image forming apparatus 1 according to the embodiment of the present disclosure will be described with reference to FIG. 1. FIG. 1 is a diagram illustrating a configuration of the image forming apparatus 1 according to the embodiment of the present disclosure.

As illustrated in FIG. 1, the image forming apparatus 1 according to the present embodiment is a multifunction peripheral. Note that other examples of the image forming apparatus 1 include a copier, a printer, or a facsimile machine. A multifunction peripheral, for example, includes at least two of the following functions: a copy function, a printing function, and a facsimile function.

The image forming apparatus 1 includes a casing 2, a sheet feed section 3, a conveyance section 4, an image forming section 5, a fixing section 6, an ejection section 7, a document reading section 8, a controller 9, and storage 10. The casing 2 internally houses the sheet feed section 3, the conveyance section 4, the image forming section 5, the fixing section 6, the ejection section 7, the controller 9, and the storage 10.

The document reading section 8 generates image data. The image data indicates an image read from an original document. The document reading section 8 outputs the generated image data to the controller 9. The document reading section 8 is a scanner, for example.

The sheet feed section 3 includes first sheet feed cassettes 31, a second sheet feed cassette 32, and a plurality of sheet feed rollers 33a and 33b. The first sheet feed cassettes 31 and the second sheet feed cassette 32 are arranged in a lower portion of the casing 2. The first sheet feed cassettes 31 and the second sheet feed cassette 32 are detachably mounted in the casing 2.

Each first sheet feed cassette 31 can internally house a stack of multiple first sheets S1. The second sheet feed cassette 32 can internally house a stack of multiple second sheets S2.

Examples of the first sheets S1 and the second sheets S2 include plain paper, copy paper, recycled paper, thin paper, thick paper, glossy paper, and overhead projector (OHP) transparency. The first sheets S1 are blank sheets. No images have been formed on either side of each first sheet S1. The second sheets S2 are used sheets. An image has been formed on only one side of each second sheet S2 by an image forming apparatus such as a copier or a printer. That is, the second sheet S2 is a so-called "reused sheet". The second sheet S2 is placed in the second sheet feed cassette 32 so that an image is to be formed on the side on which no images have been formed.

The sheet feed rollers 33a pick up the uppermost first sheets S1 placed in the first sheet feed cassettes 31 a sheet at a time. The sheet feed rollers 33a send a picked up first sheet S1 to the conveyance section 4. The sheet teed rollers 33b pick up the uppermost second sheets S2 placed in the second sheet feed cassette 32 a sheet at a time. The sheet feed rollers 33b send a picked up second sheet S2 to the conveyance section 4.

Note that the sheet feed section 3 further includes a manual feed table 34 and a sheet feed roller 33c. A portion of the manual feed table 34 is externally exposed from the casing 2. Pluralities of the first sheets S1 or the second sheets S2 may be stacked on the manual feed table 34. The sheet feed roller 33c picks up the uppermost first sheets S1 or second sheets S2 placed on the manual feed table 34 a sheet at a time. The sheet feed roller 33c sends a picked up first sheet S1 or second sheet S2 to the conveyance section 4.

The conveyance section 4 conveys the first sheet S1 or the second sheet S2 along a predetermined conveyance path. The conveyance path extends from the sheet feed section 3 to the ejection section 7 through the image forming section 5 and the fixing section 6. The conveyance section 4 includes a plurality of roller pairs arranged along the conveyance path.

The image forming section 5 forms a toner image on the first sheet S1 or the second sheet S2. The image forming section 5 is located farther downstream in the sheet conveyance path than the sheet feed section 3. The image forming section 5 includes four image forming units 51y, 51c, 51m, 51k, and a transfer section 55.

A yellow toner is supplied to the image forming unit 51y. A cyan toner is supplied to the image forming unit 51c. A magenta toner is supplied to the image forming unit 51m. A black toner is supplied to the image forming unit 51k. The four image forming units 51y, 51c, 51m, and 51k share an identical configuration. Therefore, the configuration of the image forming unit 51y will be described below, and description of the configurations of the image forming units 51c, 51m, and 51k will be omitted.

The image forming unit 51y includes an image bearing member 52, a development section 53, and a charger 54. The charger 54 charges the image bearing member 52 to a predetermined charge potential. The charged image bearing member 52 is irradiated by a laser based on image data. As a result, an electrostatic latent image is formed on a peripheral surface of the image bearing member 52. The development section 53 supplies the yellow toner to the image bearing member 52 to develop the electrostatic latent image on the image bearing member 52. As a result, a yellow toner image is formed on the peripheral surface of the image bearing member 52.

The transfer section 55 includes an intermediate transfer belt 56. Toner images of corresponding colors are transferred from each of the image forming units 51y, 51c, 51m, and 51k to the intermediate transfer belt 56. The toner images of the respective colors are superimposed upon each other on the intermediate transfer belt 56. The intermediate transfer belt 56 transfers the toner images to the first sheet S1 or the second sheet S2. As a result, a toner image based on the image data is formed on the first sheet S1 or the second sheet S2.

The fixing section 6 is located farther downstream in the conveyance path than the image forming section 5. The fixing section 6 includes a heat member 61 and a pressure member 62. The pressure member 62 presses against the heat member 61. The heat member 61 and the pressure member 62 apply heat and pressure to the first sheet S1 or the second sheet S2 with the toner image to fix the toner image to the first sheet S1 or the second sheet S2. The first sheet S1 or the second sheet S2 is ejected to the ejection section 7 after passing the fixing section 6.

The storage 10 includes read-only memory (ROM) and random-access memory (RAM). The ROM stores a computer program, for example. The RAM stores the image data, sheet feed section information, and reference information, for example. The sheet feed section information describes the sheets placed in each of the first sheet feed cassettes 31 and the second sheet feed cassette 32. The sheet feed section information is preregistered by a user, for example.

The reference information includes a plurality of categories, a plurality of reference images, and a plurality of reference character strings. Each of the categories includes at least one reference image belonging thereto. A reference image and a reference character string are information that is likely to be shown to an outsider, for example. Examples of the categories include a logo category and a secret information category. The reference image exhibits a company logo or secret information, for example. The reference character string, for example, is a character string indicating a company name or a character string indicating secret information (the word "Confidential", for example). Note that the user registers the reference information when the image forming apparatus 1 is operated for the first time, for example.

The controller 9 includes a processor such as a central processing unit (CPU), for example. The controller 9 controls the sheet feed section 3, the conveyance section 4, the image forming section 5, and the fixing section 6 according to the computer program stored in the storage 10.

Figure 2:
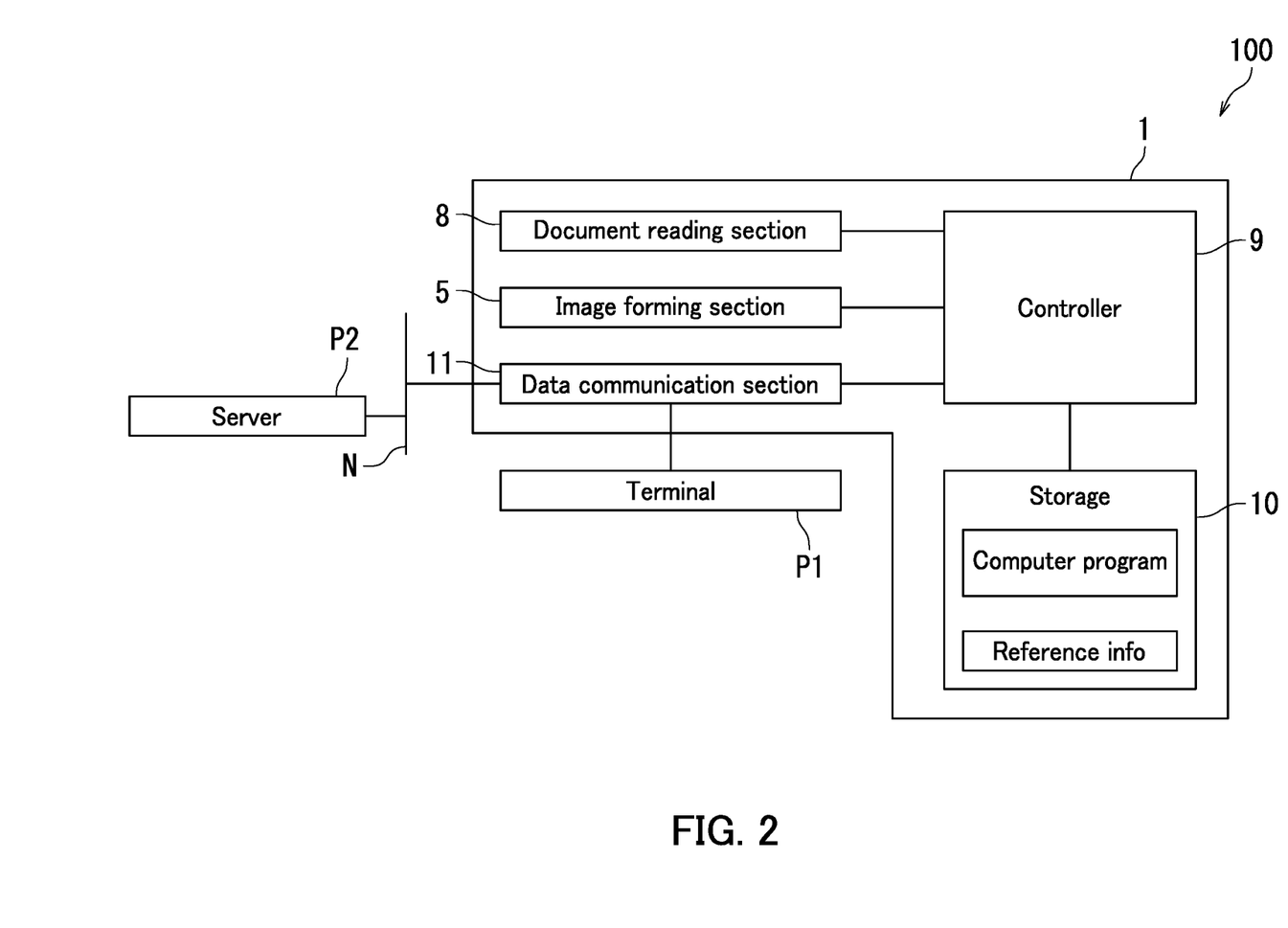
FIG. 2 is a block diagram illustrating an image forming system according to the embodiment of the present disclosure.

Next, the configuration of the image forming apparatus 1 will be further described with reference to FIG. 2. FIG. 2 is a block diagram illustrating an image forming system 100 according to the embodiment of the present disclosure.

As illustrated in FIG. 2, the image forming apparatus 1 further includes a data communication section 11. The data communication section 11 exchanges various data with a terminal P1 connected to the image forming apparatus 1. Examples of the terminal P1 include a personal computer.

The image forming apparatus 1 according to the present embodiment is a part of the image forming system 100. The image forming system 100 includes a server P2. The data communication section 11 exchanges various data with the server P2 through a network N. The network N is a local area network (LAN), a wide area network (WAN), or the Internet, for example.

The controller 9 implements an image forming process based on input information including setting data indicating various settings such as density adjustment, image quality adjustment, and sheet specification. The input information is inputted from the terminal P1, the server P2, or a predetermined input operation section included in the image forming apparatus 1. The input information is stored in the storage 10 with the image data. Note that the image data may also be inputted from the terminal P1 or the server P2.

The controller 9 implements an image determination process and the image forming process based on the input information when an image determination function is set to active, for example. The image determination function determines whether or not the image indicated by the image data belongs to any of the categories of the reference information stored in the storage 10. The controller 9 starts the image determination process and the image forming process according to a signal to start processing. The signal to start processing is inputted from the predetermined input operation section included in the image forming apparatus 1, the terminal P1, or the server P2, for example.

The controller 9 determines whether or not the image belongs to any of the categories of the reference information in the image determination process. The image determination process uses an image identifying program such as deep learning, for example.

The controller 9 calculates, for each of the categories, probability that the image belongs to the category in the image determination process. The controller 9 determines that the image belongs to the category when the calculated probability is equal to or greater than a threshold. By contrast, the controller 9 determines that the image does not belong to the category when the calculated probability is less than the threshold. Note that when the calculated probability indicates that the image belongs to multiple categories, for example, the controller 9 determines that the image belongs to the category with the highest calculated probability from the multiple categories.

The controller 9 directs the sheet feed section 3, the conveyance section 4, and the image forming section 5 to form the image on a second sheet S2 in the image forming process when the input information does not include information specifying a first sheet S1 and the controller 9 has determined that the image does not belong to any of the categories. As a result, an image that is unlikely to be shown to an outsider is formed on a reused sheet, making effective use of used sheets.

The controller 9 confirms whether or not the image may be formed on a first sheet S1 when the input information includes information specifying a first sheet S1 and the controller 9 has determined that the image does not belong to any of the categories. Specifically, the controller 9 directs a predetermined display section included in the image forming apparatus 1 or the terminal P1 to display a screen for confirming the sheet on which the image is to be formed. As a result, the user confirms the sheet, and the image is formed on a blank sheet or a reused sheet according to a specification of the user. Therefore, the image can be prevented from being mistakenly formed on a blank sheet.

By contrast, the controller 9 directs the sheet feed section 3, the conveyance section 4, and the image forming section 5 to form the image on a first sheet S1 in the image forming process when the input information does not include information specifying a second sheet S2 and the controller 9 has determined that the image belongs to any of the categories. As a result, an image that is likely to be shown to an outsider is formed on a blank sheet.

The controller 9 confirms whether or not the image may be formed on a second sheet S2 when the input information includes information specifying a second sheet S2 and the controller 9 has determined that the image belongs to any of the categories. Specifically, the controller 9 directs the predetermined display section included in the image forming apparatus 1 or the terminal P1 to display a screen for confirming a sheet on which the image is to be formed. As a result, the user confirms the sheet, and the image is formed on a blank sheet or a reused sheet according to the specification of the user. Therefore, the image can be prevented from being mistakenly formed on a reused sheet.

In the image forming apparatus 1 according to the present embodiment, the image is formed on a first sheet S1 or a second sheet S2 based on the image data and the reference information when the image determination function is active. As a result, there is less concern that an image that is likely to be shown to an outsider may be mistakenly printed on a reused sheet. Also, an image that is unlikely to be shown to an outsider can be formed on a reused sheet, and used sheets can be effectively reused.

The controller 9 stores the image in the storage 10 as a reference image when determining that the image belongs to any of the categories. Therefore, the reference images within the categories of reference information stored in the storage 10 increase. As a result, determination precision of the controller 9 in the image determination process can be increased.

In the image forming apparatus 1 according to the present embodiment, the controller 9 stores the image in the storage 10 when determining that the image belongs to any of the categories. As a result, the user can easily store a given image in the storage 10 as reference information. Also, an amount of work for the user storing the image in the storage 10 as reference information can decrease.

The controller 9 also extracts a keyword from the image to implement the image determination process. An image recognition program such as optical character recognition (OCR), for example, is used to extract the keyword. The controller 9 determines whether or not the image belongs to a category by matching the extracted keyword with each of the reference character strings. Note that the controller 9 may determine whether or not the image belongs to a category by pattern-matching the image with each of the character strings.

The controller 9 stores the keyword in the storage 10 as a reference character string when determining that the keyword belongs to a category. As a result, the determination precision of the controller 9 in the image determination process can be increased. Furthermore, in the image forming apparatus 1 according to the present embodiment, the controller 9 stores the keyword in the storage 10 when determining that the keyword belongs to a category. As a result, the user can easily store a given keyword in the storage 10 as reference information.

Figure 3:
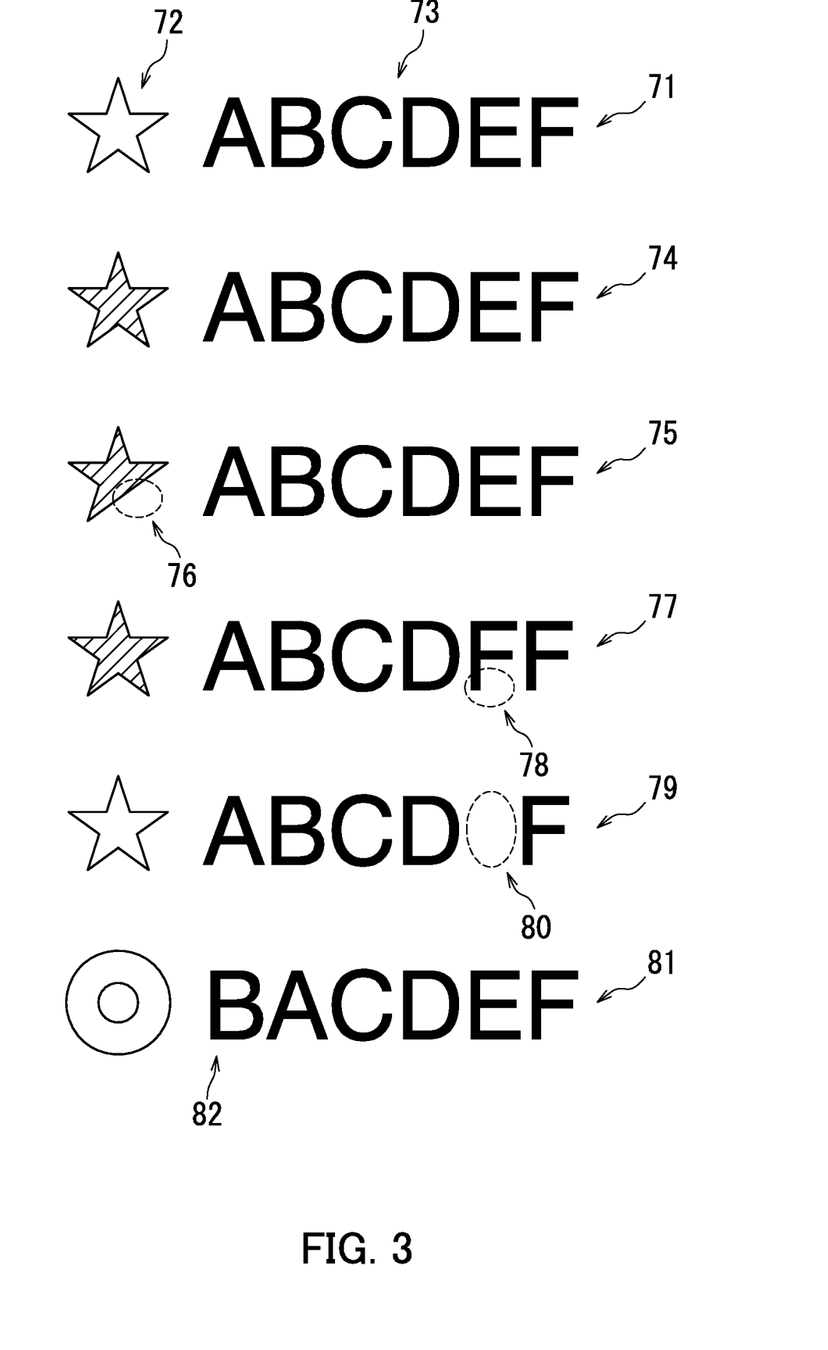
FIG. 3 is a diagram illustrating an image determination example of the image forming apparatus according to the embodiment of the present disclosure.

Next, a determination example of the image determination process performed by the controller 9 will be described with reference to FIGS. 1 to 3. FIG. 3 illustrates an example of images formed by the image forming apparatus 1 according to the embodiment of the present disclosure. As illustrated in FIG. 3, the example of the images includes an image 71, an image 74, an image 75, an image 77, an image 79, and an image 81.

The image 71 is a reference image stored in the storage 10. The image 71 is a company name. The image 71 belongs to an "ABCDEF" Company category, which is a company name category, for example. The image 71 includes an image 72 exhibiting a company logo a star-shaped mark) and a character string 73 exhibiting the company name. The images 74, 75, 77, 79, and 81 are indicated by image data.

The image 74 includes a star-shaped mark of a different color than the image 71. The controller 9 calculates probability that the image 74 belongs to the same category as the image 71. The controller 9 refers to the image 71 and determines that the image 74 belongs to the same category as the image 71 when the calculated probability is equal to or greater than the threshold, even though the star-shaped marks are of different colors. The controller 9 stores the image 74 in the storage 10 as a reference image.

The image 75 includes a star-shaped mark that has a different shape and color than the image 71, and a different shape than the image 74. The controller 9 calculates probability that the image 75 belongs to the same category as the images 71 and 74. The controller 9 refers to the image 74 and determines that the image 75 belongs to the same category as the images 71 and 74 when the calculated probability is equal to or greater than the threshold, even though a portion of the shape of the star-shaped mark is different. The controller 9 stores the image 75 in the storage 10 as a reference image.

The image 77 includes a star-shaped mark of a different color than the image 71, and a portion 78 of a character "E" in the character string exhibiting the company name is missing. The controller 9 calculates a probability that the image 77 belongs to the same category as the images 71, 74, and 75. The controller 9 refers to the image 74 and determines that the image 77 belongs to the same category as the images 71, 74, and 75 when the calculated probability is equal to or greater than the threshold, even though a portion of the character string is different. The controller 9 stores the image 77 in the storage 10 as a reference image.

The image 79 includes a space 80 instead of one character of the company name. The controller 9 calculates a probability that the image 79 belongs to the same category as the images 71, 74, 75, and 77. The controller 9 refers to the image 71 and determines that the image 79 belongs to the same category as the images 71, 74, 75, and 77 when the calculated probability is equal to or greater than the threshold even though the image 79 includes the space 80 instead of one character. The controller 9 stores the image 79 in the storage 10 as a reference image.

The image 81 includes a mark of a different shape and a company name 82 that is different than the image 71. The controller 9 calculates a probability that the image 81 belongs to the same category as the images 71, 74, 75, 77, and 79. The controller 9 refers to the images 71, 74, 75, 77, and 79, and determines that the image 81 does not belong to the same category as the images 71, 74, 75, 77, and 79 when the calculated probability is less than the threshold because the shape of the mark and the company name 82 are different.

Figure 4:
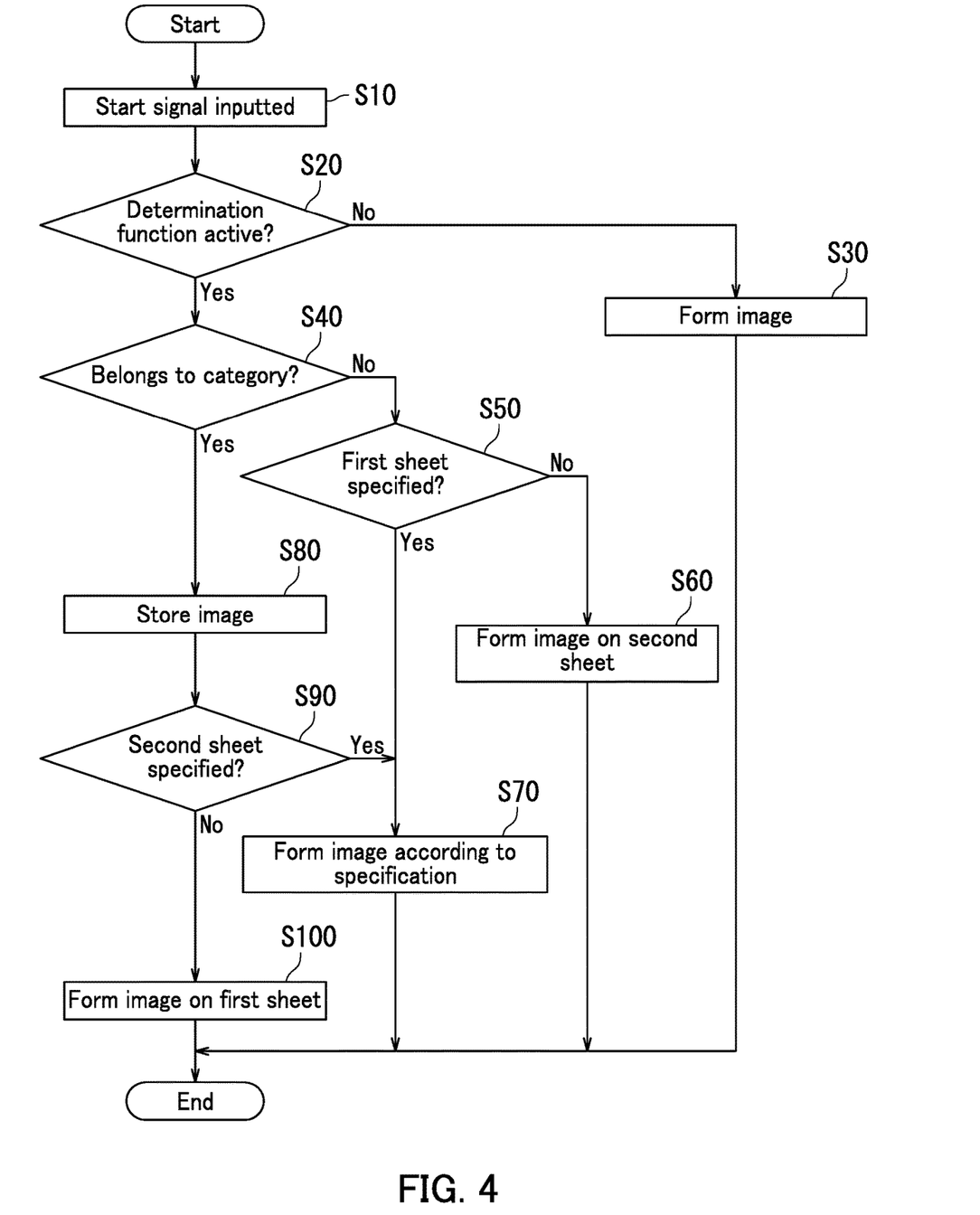
FIG. 4 is a flowchart illustrating an image determination process and an image forming process performed by the controller.

Next, the image determination process and the image forming process performed by the controller 9 will be described with reference to FIGS. 1, 2, and 4. FIG. 4 is a flowchart illustrating the image determination process and the image forming process performed by the controller 9.

When the start signal has been inputted in Step S10, the controller 9 determines whether or not the image determination function is active in Step S20. When the controller 9 has determined that the image determination function is not active (No in Step S20), the controller 9 directs the sheet feed section 3, the conveyance section 4, and the image forming section 5 to form the image based on the image data in Step S30, and ends the image forming process.

When the controller 9 has determined that the image determination function is active (Yes in Step S20), the controller 9 determines whether or not the image belongs to a category in Step S40. When the controller 9 has determined that the image does not belong to a category (No in Step S40), the controller 9 determines whether or not the input information includes information specifying a first sheet S1 in Step S50.

When the input information does not include information specifying a first sheet S1 (No in Step S50), the controller 9 directs the sheet feed section 3, the conveyance section 4, and the image forming section 5 to form the image based on the image data on a second sheet S2 in Step S60, and ends the image forming process. When the input information includes information specifying a first sheet S1 (Yes in Step S50), the controller 9 directs the terminal P1 to confirm with the user in Step S70. The controller 9 directs the sheet feed section 3, the conveyance section 4, and the image forming section 5 in accordance with the specification of the user after confirming with the user, and ends the image forming process.

When the controller 9 has determined that the image belongs to a category (Yes in Step S40), the controller 9 stores the image in the storage 10 as reference information in Step S80. After the image has been stored in the storage 10, the controller 9 determines whether or not the input information includes information specifying a second sheet S2 in Step S90.

When the input information does not include information specifying a second sheet S2 (No in Step S90), the controller 9 directs the sheet feed section 3, the conveyance section 4, and the image forming section 5 to form the image based on the image data on a first sheet S1 in Step S100, and ends the image forming process. When the input information includes information specifying a second sheet S2 (Yes in Step S90), the controller 9 directs the terminal P1 to confirm with the user and directs the sheet feed section 3, the conveyance section 4, and the image forming section 5 in accordance with the specification of the user in Step S70, and ends the image forming process.

The image forming apparatus 1 according to the embodiment of the present disclosure is described above with reference to FIGS. 1 to 4. However, the present disclosure is not limited to the embodiment, and may be implemented in various manners within a scope not departing from the gist of the present disclosure.

For example, in the embodiment of the present disclosure, the reference information is stored in the storage 10. However, the present disclosure is not limited hereto. The reference information need only be accessible when the controller 9 implements the image determination process. According to another embodiment, for example, a server P2 may include storage that stores reference information. In an image forming system 100 according to the other embodiment, a controller 9 acquires the reference information from the server P2 through a network N. As a result, capacity of storage 10 need not be large.

Also in the embodiment of the present disclosure, the controller 9 determines whether or not the image indicated by the image data belongs to any of a plurality of categories. However, the present disclosure is not limited hereto. The controller 9 need only implement the image forming process. In another embodiment, a server P2, for example, may include a controller that determines whether or not an image belongs to a category. According to the other embodiment, a controller 9 is an example of a first controller of the present disclosure. The controller of the server P2 is an example of a second controller of the present disclosure. In an image forming system 100 according to the other embodiment, the controller 9 acquires a determination result from the server P2 through a network N. The controller 9 need only implement the image forming process based on the determination result and the image data. As a result, a load on the controller 9 of an image forming apparatus 1 can be reduced.

Furthermore, according to the embodiment of the present disclosure, an image is stored in the storage 10 as a reference image when the image has been determined to belong to a category. However, the present disclosure is not limited hereto. The controller 9 need only store the image in the storage 10 as a reference image when directing the image forming section 5 to form the image on a first sheet S1.

The controller 9 may store the image in the storage 10 as a reference image when the image is formed on a first sheet S1 by a specification of the user even when the controller 9 has determined that the image does not belong to any category. As a result, categories of the reference information stored in the storage 10 increase. Therefore, when an image that is likely to be shown to an outsider is added, for example, the user can easily store the added image in the storage 10 as reference information.

Also, the controller 9 may delete a portion of the reference images included in the reference information. The controller 9 may delete a reference image within a category that the image belongs to from the storage 10 when the image is formed on a second sheet S2 according to specification of the user, even if the controller 9 has determined that the image belongs to the category. As a result, categories of the reference information stored in the storage 10 decrease. Therefore, when an image that is likely to be shown to an outsider is excluded, for example, the user can easily delete a reference image in a category that the excluded image belongs to.

Note that the drawings are schematic illustrations that emphasize elements of configuration in order to facilitate understanding thereof. Properties of each of the elements, such as thickness and length thereof, may differ from actual properties of the element. Furthermore, aspects of the elements of configuration illustrated in the above embodiments such as shapes thereof are but one example and not particularly limited. Each of the elements may be altered within a scope not substantially departing from the effects of the present disclosure.

What is claimed is:

1. An image forming apparatus, comprising:
    a first feed cassette configured to house a first sheet;
    a second feed cassette configured to house a second sheet;
    an image forming section configured to form an image on the first sheet or the second sheet; and
    a controller configured to control the image forming section, wherein
    the first sheet is a blank sheet of which the image has not been formed on either side of the first sheet,
    the second sheet is a reused sheet of which one side has been used, the image has been formed on only the one side of the second sheet, and the image has not been formed on another side of the second sheet,
    the second feed cassette houses the second sheet such that the image is to be formed on the other side on which an image has not been formed,
    the image forming section does not form the image on the one side of the second sheet but forms the image only on the other side of the second sheet,
    the controller
    determines whether or not an image determination function is active when a start signal for starting processing is inputted, the image determination function determining whether or not the image indicated by image data belongs to any categories,
    directs the image forming section to form the image indicated by the image data when determining that the image determination function is not active, and
    refers to reference images each belonging to any of the categories to determine whether or not the image indicated by the image data belongs to any of the categories when determining that the image determination function is active,
    the controller calculates, for each of the categories, probability that the image belongs to a category when determining whether or not the image belongs to any of the categories, and determines that the image belongs to the category as long as the probability is equal to or greater than a threshold even when the image is of a different color from the reference image, of a different shape from the reference image, includes a space instead of a character relative to the reference image, or is missing a portion of a character relative to the reference image,
    the controller, when determining that the image belongs to two or more of the categories, determines that the image belongs to a category with the highest calculated probability from the two or more of the categories, and
    the controller
    directs the image forming section to form the image on the second sheet when determining that input information inputted according to an operation of a user does not include an instruction to form the image on the first sheet and the image does not belong to any of the categories,
    directs the image forming section to form the image on the first sheet and stores the image as the reference image when determining that the input information does not include an instruction to form the image on the second sheet and the image belongs to any of the categories,
    informs the user whether the image is to be formed on the first sheet or the second sheet when the input information includes the instruction to form the image on the first sheet and the image is determined not to belong to any of the categories,
    stores the image as the reference image to increase a number of the categories when, after informing the user in a case where the input information includes the instruction to form the image on the first sheet and the image is determined not to belong to any of the categories, the operation of the user includes the instruction to form the image on the first sheet and the image is formed on the first sheet,
    informs the user whether the image is to be formed on the first sheet or the second sheet when the input information includes the instruction to form the image on the second sheet and the image is determined to belong to any of the categories, and
    deletes the reference image in the category to which the image belongs to decrease the number of the categories when, after informing the user in a case where the input information includes the instruction to form the image on the second sheet and the image is determined to belong to any of the categories, the operation of the user includes the instruction to form the image on the second sheet and the image is formed on the second sheet.

2. The image forming apparatus according to claim 1, wherein
the controller, based on the input information inputted according to the operation of the user, activates or deactivates the image determination function that determines whether or not the image belongs to any of the categories.

3. The image forming apparatus according to claim 1, further comprising: storage configured to store the reference images for each of the categories, wherein the controller stores the image determined to belong to any of the categories in the storage as the reference image.

4. The image forming apparatus according to claim 1, wherein
the categories include a logo category and a secret information category.

5. The image forming apparatus according to claim 1, wherein
the controller uses deep learning to determine whether or not the image belongs to any of the categories.

6. The image forming apparatus according to claim 1, further comprising
storage configured to store the reference images for each of the categories, wherein the controller
determines that the image belongs to the category as long as the probability is equal to or greater than the threshold even when the image is of the different color from the reference image and stores the image of the different color in the storage as the reference image,
determines that the image belongs to the category as long as the probability is equal to or greater than the threshold even when the image is of the different shape from the reference image and stores the image of the different shape in the storage as the reference image,
determines that the image belongs to the category as long as the probability is equal to or greater than the threshold even when the image includes the space instead of the character relative to the reference image and stores the image including the space instead of the character in the storage as the reference image, and
determines that the image belongs to the category as long as the probability is equal to or greater than the threshold even when the image is missing the portion of the character relative to the reference image and stores the image missing the portion of the character in the storage as the reference image.

7. An image forming system, comprising:
an image forming apparatus comprising an image forming section configured to form an image on a first sheet or a second sheet; and
a server configured to exchange data with the image forming apparatus through a network, wherein
the image forming apparatus further comprises:
a first controller configured to control the image forming section;
a first feed cassette configured to house the first sheet; and
a second feed cassette configured to house the second sheet,
the first sheet is a blank sheet of which the image has not been formed on either side of the first sheet,
the second sheet is a reused sheet of which one side has been used, an image has been formed on only the one side of the second sheet, and the image has not been formed on another side of the second sheet,
the second feed cassette houses the second sheet such that the image is to be formed on the other side on which an image has not been formed,
the image forming section does not form the image on the one side of the second sheet but forms the image only on the other side of the second sheet,
the server comprises a second controller configured to refer to reference images each belonging to any categories to determine whether or not the image belongs to any of the categories,
the second controller
determines whether or not an image determination function is active when a start signal for starting processing is inputted, the image determination function determining whether or not the image indicated by image data belongs to any of a of the categories,
directs the image forming section to form the image indicated by the image data when determining that the image determination function is not active, and
refers to the reference images each belonging to any of the categories to determine whether or not the image indicated by the image data belongs to any of the categories when determining that the image determination function is active,
the second controller calculates, for each of the categories, probability that the image belongs to a category when determining whether or not the image belongs to any of the categories, and determines that the image belongs to the category as long the probability is equal to or greater than a threshold even when the image is of a different color from the reference images, of a different shape from the reference images, includes a space instead of a character relative to the reference images, or is missing a portion of a character relative to the reference images,
the second controller, when determining that the image belongs to two or more of categories, determines that the image belongs to a category with the highest calculated probability from the two or more of the categories,
the first controller
directs the image forming section to form the image on the second sheet when the second controller has determined that input information inputted according to an operation of a user does not include an instruction to form the image on the first sheet and the image does not belong to any of the categories,
directs the image forming section to form the image on the first sheet when the second controller has determined that the input information does not include an instruction to form the image on the second sheet and the image belongs to any of the categories, and
informs the user whether the image is to be formed on the first sheet or the second sheet when the second controller has determined that the input information includes the instruction to form the image on the first sheet and the image does not belong to any of the categories,
the second controller stores the image as a reference image to increase a number of categories when, after the user has been informed in a case where the input information includes the instruction to form the image on the first sheet and the image is determined not to belong to any of the categories, the operation of the user includes the instruction to form the image on the first sheet and the image is formed on the first sheet, the first controller informs the user whether the image is to be formed on the first sheet or the second sheet when the second controller has determined that the input information includes the instruction to form the image on the second sheet and the image belongs to any of the categories, and the second controller deletes the reference image in the category to which the image belongs to decrease the number of the categories when, after the user has been informed in a case where the input information includes the instruction to form the image on the second sheet and the image is determined to belong to any of the categories, the operation of the user includes the instruction to form the image on the second sheet and the image is formed on the second sheet.

8. The image forming system according to claim 7, wherein the server further comprises storage configured to store the reference images for each of the categories, and the second controller stores the image determined to belong to any of the categories in the storage as the reference image.

9. The image forming system according to claim 7, wherein the server further comprises storage configured to store the reference images for each of the categories, and the second controller determines that the image belongs to the category as long as the probability is equal to or greater than the threshold even when the image is of the different color from the reference image and stores the image of the different color in the storage as the reference image, determines that the image belongs to the category as long as the probability is equal to or greater than the threshold even when the image is of the different shape from the reference image and stores the image of the different shape in the storage as the reference image, determines that the image belongs to the category as long as the probability is equal to or greater than the threshold even when the image includes the space instead of the character relative to the reference image and stores the image including the space instead of the character in the storage as the reference image, and determines that the image belongs to the category as long as the probability is equal to or greater than the threshold even when the image is missing the portion of the character relative to the reference image and stores the image missing the portion of the character in the storage as the reference image.

* * * * *